United States Patent
Liu et al.

(10) Patent No.: US 12,099,002 B2
(45) Date of Patent: Sep. 24, 2024

(54) SINGLE-BEAM PHOTOTHERMAL MEASUREMENT APPARATUS AND MEASUREMENT METHOD FOR ABSORPTIVE DEFECTS

(71) Applicants: Shanghai Institute of Optics And Fine Mechanics, Chinese Academy of Sciences, Shanghai (CN); Shanghai Hengyi Optics And Fine Mechanics Co., Ltd., Shanghai (CN)

(72) Inventors: Shijie Liu, Shanghai (CN); Kaizao Ni, Shanghai (CN); Jianda Shao, Shanghai (CN); Weiwei Wang, Shanghai (CN); Tianzhu Xu, Shanghai (CN); Yingjia Li, Shanghai (CN); Qi Lu, Shanghai (CN)

(73) Assignees: Shanghai Institute of Optics And Fine Mechanics, Chinese Academy of Sciences, Shanghai (CN); Shanghai Hengyi Optics And Fine Mechanics Co., Ltd, Shanghai (CN)

( * ) Notice: Subject to any disclaimer, the term of this patent is extended or adjusted under 35 U.S.C. 154(b) by 325 days.

(21) Appl. No.: 17/566,675

(22) Filed: Dec. 30, 2021

(65) Prior Publication Data
US 2022/0120675 A1 Apr. 21, 2022

Related U.S. Application Data

(63) Continuation of application No. PCT/CN2020/092785, filed on May 28, 2020.

(30) Foreign Application Priority Data
May 11, 2020 (CN) .......................... 202010391287.0

(51) Int. Cl.
*G01N 21/31* (2006.01)
*G01N 21/958* (2006.01)
(Continued)

(52) U.S. Cl.
CPC ............ *G01N 21/31* (2013.01); *G01N 21/958* (2013.01); *G02B 26/105* (2013.01); *G02B 27/14* (2013.01);
(Continued)

(58) Field of Classification Search
CPC .... G01N 21/31; G01N 21/958; G02B 26/105; G02B 27/14; G02B 27/283; G02B 27/286
See application file for complete search history.

(56) References Cited

U.S. PATENT DOCUMENTS 8,264,693 B2    9/2012   Stoica et al.
9,175,987 B2 *  11/2015  Kuroda ................. G01D 5/38
(Continued)

FOREIGN PATENT DOCUMENTS

CN    101082537 A    12/2007
CN    106769881 A    5/2017
CN    111122599 A    5/2020

*Primary Examiner* — Edmond C Lau
*Assistant Examiner* — Joshua M Carlson
(74) *Attorney, Agent, or Firm* — Mei & Mark LLP; Manni Li

(57) ABSTRACT

A single-beam photothermal measurement apparatus and a measurement method for absorptive defects. The apparatus comprises a common-path-type structure and a non-common-path-type structure. The present invention is simple in optical structure and convenient to align and adjustment. The measurement result is stable, and measurement signal anomalies caused by environmental vibration and sample tilt are avoided. By detecting a power change on the edge of a beam spot, the measurement sensitivity of a system is remarkably improved.

3 Claims, 2 Drawing Sheets

(51) Int. Cl.
  *G02B 26/10* (2006.01)
  *G02B 27/14* (2006.01)
  *G02B 27/28* (2006.01)

(52) U.S. Cl.
  CPC ......... *G02B 27/283* (2013.01); *G02B 27/286* (2013.01); *G01N 2201/06113* (2013.01); *G01N 2201/0636* (2013.01)

(56) References Cited

U.S. PATENT DOCUMENTS

| | | |
|---|---|---|
| 10,942,116 B2 * | 3/2021 | Prater .................... G01N 21/35 |
| 11,946,863 B2 * | 4/2024 | Lei ...................... G01N 21/9501 |
| 2018/0180642 A1 * | 6/2018 | Shetty ................. G01Q 30/025 |

* cited by examiner

SINGLE-BEAM PHOTOTHERMAL MEASUREMENT APPARATUS AND MEASUREMENT METHOD FOR ABSORPTIVE DEFECTS

CROSS-REFERENCE TO RELATED APPLICATIONS

The subject application is a continuation of PCT/CN2020/092785 filed on May 28, 2020, which claims priority on Chinese Application No. 202010391287.0 filed May 11, 2020 in China. The contents and subject matter of the PCT international application and Chinese priority application are incorporated herein by reference.

TECHNICAL FIELD

The present invention relates to defect detection in an optical element, in particular, measurement apparatus and method for detecting surface absorptive defect in an optical element.

BACKGROUND ART

In high-power laser systems, the laser-induced damage of optical elements often causes problem which has been a core factor in limiting the output power enhancement of large laser facilities. Metal impurities in growth solution introduced during the growth process of an optical material, metal and nonmetal impurities, such as polishing agent and magnetorheological fluid, left on the surface after grinding, polishing, and figuring, and nodule defects in a film layer after coating have higher absorption than that of the optical element itself. These defects act as absorption centers which strongly absorb the laser under the irradiation of high-power laser and the tolerable range of the element is exceeded, thereby causing damage to the element.

At present, methods for defect detection mainly comprise microscopic scattering dark field imaging technique, fluorescent microscopic imaging technique, and photothermal scanning imaging technique. The microscopic scattering dark field imaging technique mainly aims at structural defects such as scratches and pits, and uses scattered light generated by the defects to perform imaging. The defects, such as impurity ions, for examples, metal and nonmetal, hardly scatter incident light, and the microscopic scattering dark field imaging technique cannot effectively detect these visually invisible defects.

In the fluorescent microscopic imaging technique, fluorescence generated by defects under the excitation of short-wavelength laser is used to image. the fluorescent microscopic imaging has low detection sensitivity, and cannot detect absorptive defects which does not emit light under the irradiation of the laser.

The traditional photothermal scanning imaging technology is based on the photothermal effect, where the surface of the element is irradiated by pump laser to generate thermal deformation and probe laser measures the degree of thermal deformation of the area. This method could detect all the above-mentioned absorptive defects with high sensitivity, but the measurement system is complex, the light path adjustment difficulty is high, the overlapping degree of two beam spots has great influence on the detection sensitivity. Especially when the surface of a large-aperture element is scanned, the overlapping degree of the two beam spots can be obviously changed due to environmental vibration and sample tilt, and even the two beam spots do not overlap, so that the measurement signal is uneven or there is no signal, and an absorptive defect may be easily missed or misrecognized.

SUMMARY OF THE INVENTION

In order to overcome the shortcomings of the existing technology, the present invention provides a single-beam photothermal measurement apparatus and a measurement method for an absorptive defect. The measurement apparatus is simple in optical structure and convenient to align and adjust. The measurement result is stable, and measurement signal anomalies caused by environmental vibration and sample tilt are avoided. By detecting a power change on the edge of a beam spot, the measurement sensitivity of a system is remarkably improved.

According to the method of the present invention, by using the absorption difference between a defect and a material substrate, the absorption anomaly of a defect area can be detected through a single beam.

In order to achieve the above objectives, the technical solution adopted by the present invention include the single-beam photothermal measurement for an absorptive defect that is either a common-path type or a non-common-path type.

The present invention provides a single-beam photothermal measurement apparatus for an absorptive defect of a common-path type, which comprises a laser, a beam expander, a power controller, a beam splitter, a power meter, a chopper, a polarization beam splitter, a quarter-wave plate, a mirror, a galvanometer scanner, a scanning lens, a converging lens, a obstruction aperture, a photoelectric detector, a lock-in amplifier, an XYZ translation stage, and a computer. In the apparatus, a sample is placed on the XYZ translation stage; the beam expander, the power controller, and the beam splitter are sequentially arranged along a direction of a beam emitted by the laser, the beam splitter divides an incident beam into weakly reflected light and strongly transmitted light with different intensities, the power meter is arranged along a direction of the weakly reflected light, and the chopper, the polarization beam splitter, the quarter-wave plate, the mirror, the galvanometer scanner, and the scanning lens are sequentially arranged along a direction of the strongly transmitted light; the strongly transmitted beam is modulated by the chopper; a modulated incident light passes through the polarization beam splitter to output p-polarized light and passes through the quarter-wave plate to output circularly polarized light; the circularly polarized light passes through the galvanometer scanner and the scanning lens, and then is focused on the surface of the sample; the surface of the sample generates thermal deformation under laser irradiation; a reflected light modulated by the thermal deformation sequentially passes through the scanning lens, the galvanometer scanner, the mirror, and the quarter-wave plate to form an s-polarized light; the s-polarized light is reflected by the polarization beam splitter and then focused by the converging lens; after the focused beam passes through the obstruction aperture, the beam on the edge of the beam spot is received by the photoelectric detector; The modulation frequency of the chopper is taken as a reference signal and is input into a second input end of the lock-in amplifier via a cable; a signal collected by the photoelectric detector is taken as a measurement signal and is input into a first input end of the lock-in amplifier; and control signal output ends of the computer are respectively connected to the control end of the XYZ translation stage and the control end of the galvanometer scanner, and an output end of the lock-in amplifier is connected to an input end of the computer.

In the single-beam photothermal measurement apparatus for an absorptive defect of the present invention, the obstruction aperture is prepared by plating circular aluminum film or chromium film on the surface of circular fused silica glass with a thickness of 0.5 mm; the transmittance of the coated area being less than or equal to 0.01%; and the radius of the coated area being greater than the beam waist radius of the beam spot incident to the obstruction aperture, such that the power of the passing beam is less than 1% of the power of the beam incident to the obstruction aperture.

The single-beam photothermal measurement apparatus for absorptive defects of the present invention is used for a measurement method for surface absorptive defects of an optical element, comprising the following steps:

(i) placing the sample on an XYZ translation stage, and moving the sample along a Z direction, such that the surface of the sample is close to a focal point of the scanning lens;

(ii) setting a modulation frequency of the chopper to be f, and setting a demodulation frequency of the lock-in amplifier to be 2 times of the modulation frequency of the chopper, that is, 2f;

(iii) driving, by the computer, an internal scanning reflecting mirror of the galvanometer scanner, such that a focused spot moves along X and Y directions on the surface of the sample to form raster scanning; the step distance of the focused spot moving along the X and Y directions being the diameter of the spot focused on the surface of the sample;

(iv) at a measurement point, inputting a measurement signal of the photoelectric detector into the lock-in amplifier, and after being demodulated by the lock-in amplifier, outputting an amplitude of a second harmonic wave (2f) of the measurement signal to the computer; recording, by the computer, the amplitude of the measurement point in real time;

(v) moving, by the XYZ translation stage, the sample to the next measurement area along the X or Y direction, and returning to the step (iii) until all measurements of the sample are completed; and (vi) drawing, by the computer, recorded signal amplitudes into an absorptive defect two-dimensional distribution graph and performing analysis, giving an analysis report, and completing an absorptive defect test of the sample.

The present invention further provides a single-beam photothermal measurement apparatus for an absorptive defect of a non-common-path type, which comprises a laser, a beam expander, a power controller, a beam splitter, a power meter, a chopper, a converging lens, a obstruction aperture, a photoelectric detector, a lock-in amplifier, an XYZ translation stage, a computer, and a second converging lens. In the apparatus of the present invention, a sample is placed on the XYZ translation stage; the beam expander, the power controller, and the beam splitter are sequentially arranged along a direction of a beam emitted by the laser; the beam splitter splits an incident beam into weakly reflected light and strongly transmitted light with different intensities; the power meter is arranged along a direction of the weakly reflected light, and the chopper is arranged along a direction of the strongly transmitted light; the strongly transmitted light is modulated by the chopper and then focused by the second converging lens to irradiate the sample; the obstruction aperture, the converging lens, and the photoelectric detector are sequentially arranged along a direction of reflected light; an output end of the photoelectric detector is connected to a first input end of the lock-in amplifier; a modulation frequency of the chopper is taken as a reference signal, and a reference signal output end is connected to a second input end of the lock-in amplifier via a cable; the output end of the lock-in amplifier is connected to an input end of the computer; and a control signal output end of the computer is connected to the control end of the XYZ translation stage.

In the single-beam photothermal measurement apparatus for an absorptive defect of the present invention, the obstruction aperture is prepared by plating circular aluminum film or chromium film on the surface of circular fused silica glass with a thickness of 0.5 mm; the transmittance of the coated area being less than or equal to 0.01%; and the radius of the coated area being greater than a beam waist radius of the beam spot incident to the obstruction aperture, such that the power of a passing beam is less than 1% of the power of the beam incident to the obstruction aperture.

The single-beam photothermal measurement apparatus for absorptive defects of the present invention is used in a measurement method for surface absorptive defects of an optical element, comprising the steps of:

(i) placing the sample on an XYZ translation stage, under the control of the computer, moving, by the XYZ translation stage, the sample along a Z direction, such that the surface of the to-be-measured sample is close to the focal point of the second converging lens;

(ii) setting a modulation frequency of the chopper to be f, and setting a demodulation frequency of the lock-in amplifier to be 2 times of the modulation frequency of the chopper, that is, 2f;

(iii) driving, by the computer, the XYZ translation stage to move, such that a spot focused by the second converging lens moves along X and Y directions on the surface of the to-be-measured sample, the stepping distance of the focused spot moving along the X and Y directions being the diameter of the spot focused on the surface of the sample;

(iv) at a measurement point, inputting a measurement signal of the photoelectric detector into the lock-in amplifier, and after being demodulated by the lock-in amplifier, outputting an amplitude of a second harmonic wave (2f) of the measurement signal to the computer; recording, by the computer, the amplitude of the measurement point in real time;

(v) under the control of the computer, moving, by the XYZ translation stage, the sample to the next measurement point along the X or Y direction, and returning to the step (iv) until all measurements of the sample are completed; and (vi) drawing, by the computer, recorded signal amplitudes into an absorptive defect two-dimensional distribution graph and performing analysis, giving an analysis report, and completing an absorptive defect test of the sample.

The present invention has the following advantages.

The single-beam photothermal measurement apparatus for absorptive defects of the present invention is simple in optical structure and convenient to align and adjustment. The measurement result is stable, and measurement signal anomalies caused by environmental vibration and sample tilt are avoided. By detecting a power change on the edge of a beam spot, the measurement sensitivity of a system is remarkably improved.

Reference numbers used in the figures refer to the following structures: 1—laser; 2—beam expander; 3—power controller; 4—beam splitter; 5—power meter; 6—chopper; 7—polarization beam splitter; 8—quarter-wave plate; 9—mirror; 10—galvanometer scanner; 11—scanning lens; 12—sample; 13—converging lens; 14—obstruction aperture; 15—photoelectric detector; 16—lock-in amplifier; 17—XYZ translation stage; 18—computer; and 19—second converging lens.

DETAILED DESCRIPTION OF THE INVENTION

The present invention is described in further detail with reference to the accompanying drawings and examples, but the protection scope of the present invention is not limited thereby.

Example 1

Figure 1:
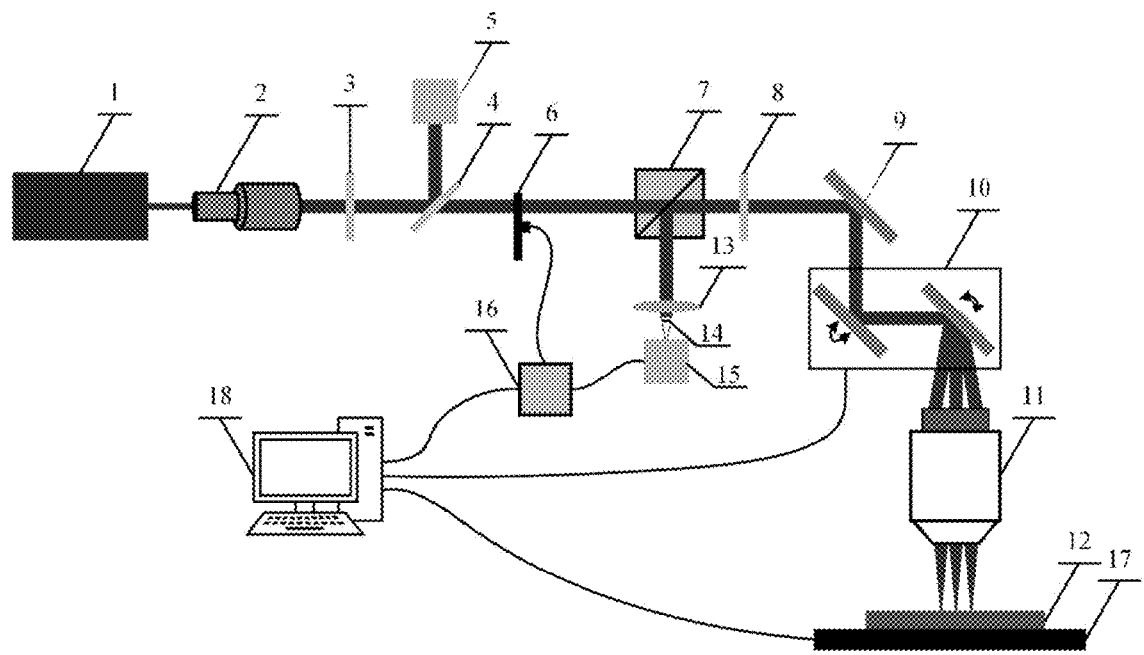
FIG. 1 shows the common-path-type single-beam photothermal measurement apparatus for absorptive defects of the present invention.

As shown in FIG. 1, the common-path-type single-beam photothermal measurement apparatus for absorptive defects of the present invention comprises a laser 1, a beam expander 2, a power controller 3, a beam splitter 4, a power meter 5, a chopper 6, a polarization beam splitter 7, a quarter-wave plate 8, a mirror 9, a galvanometer scanner 10, a scanning lens 11, a converging lens 13, a obstruction aperture 14, a photoelectric detector 15, a lock-in amplifier 16, an XYZ translation stage 17 and a computer 18, and a to-be-measured sample 12 is placed on the XYZ translation stage 17.

The beam expander 2, the power controller 3, and the beam splitter 4 are sequentially arranged along a direction of a beam emitted by the laser 1; the beam splitter 4 divides an incident beam into weakly reflected light and strongly transmitted light with different intensities; the power meter 5 is arranged along a direction of the weakly reflected light; the power meter 5 is used for monitoring power and stability of incident light; and the chopper 6, the polarization beam splitter 7, the quarter-wave plate 8, the mirror 9, the galvanometer scanner 10 and the scanning lens 11 are sequentially arranged along a direction of the strongly transmitted light.

The strongly transmitted beam is modulated by the chopper 6. A modulated incident light passes through the polarization beam splitter 7 to output p-polarized light, and passes through the quarter-wave plate 8 to output circularly polarized light. The circularly polarized light passes through the galvanometer scanner 10 and the scanning lens 11 and then is focused on the surface of the to-be-measured sample 12. The surface of the to-be-measured sample 12 generates thermal deformation under laser irradiation. A reflected light modulated by the thermal deformation sequentially passes through the scanning lens 11, the galvanometer scanner 10, the mirror 9 and the quarter-wave plate 8 to form s-polarized light. The s-polarized light is reflected by the polarization beam splitter 7 and then is focused by the converging lens 13. After a focused beam passes through the obstruction aperture 14, the beam on the edge of the spot is received by the photoelectric detector 15;

A modulation frequency of the chopper 6 is taken as a reference signal and is input into a second input end of the lock-in amplifier 16 via a cable. A measurement signal output by the photoelectric detector 15 is input into a first input end of the lock-in amplifier 16.

Control signal output ends of the computer 18 is respectively connected to the control end of the XYZ translation stage 17 and the control end of the galvanometer scanner 10, and an output end of the lock-in amplifier 16 is connected to an input end of the computer 18.

Figure 2:
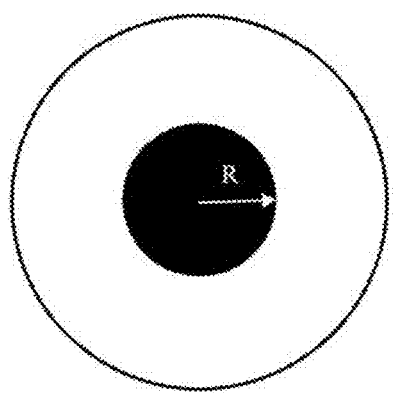
FIG. 2 shows the structure of the obstruction aperture provided by the present invention.

As shown in FIG. 2, the obstruction aperture 14 provided by the present invention and the manufacturing process thereof is as follows: plating circular aluminum film or chromium film on the surface of circular fused silica glass with a thickness of 0.5 mm. The transmittance of the coated area is less than or equal to 0.01%. The radius of the coated area is greater than a beam waist radius of a light spot incident to the obstruction aperture 14, such that the power of the passing beam is less than 1% of the power of the beam incident to the obstruction aperture 14.

Provided is a measurement method for surface absorptive defects of an optical element by using the common-path-type single-beam photothermal measurement apparatus for absorptive defects, characterized in that the method comprises the following steps.

(1) Sample 12 to be measured is placed on an XYZ translation stage 17, under the control of the computer, the XYZ translation stage 17 moves the sample 12 along a Z direction, such that the surface of the sample 12 is close to the focal point of the scanning lens 11, and the beam expander 2 is adjusted, such that the diameter of a beam expanded by the beam expander 2 meets the pupil entrance requirement of the galvanometer scanner 10.

(2) A modulation frequency of the chopper 6 is set to be f, and a demodulation frequency of the lock-in amplifier 16 is set to be 2 times of the modulation frequency of the chopper 6, that is, 2f.

(3) The computer 18 drives an internal scanning reflecting mirror of the galvanometer scanner 10, such that a focused spot moves along X and Y directions on the surface of the sample to form raster scanning. The stepping distance of the focused spot moving along the X and Y directions is the diameter of the spot focused on the surface of the sample 12.

(4) At a measurement point, a measurement signal of the photoelectric detector 15 is input into the lock-in amplifier 16, and after being demodulated by the lock-in amplifier 16, an amplitude of a second harmonic wave (2f) of the measurement signal is output to the computer 18. The computer 18 records the amplitude of the measurement point in real time.

(5) The XYZ translation stage 17 moves the sample 12 to the next measurement area along the X or Y direction, and the step (3) is returned until all measurements of the to-be-measured sample are completed.

(6) The computer 18 draws recorded signal amplitudes into an absorptive defect two-dimensional distribution graph and performing analysis, gives an analysis report, and completes an absorption defect test of the sample 12.

Example 2

Figure 3:
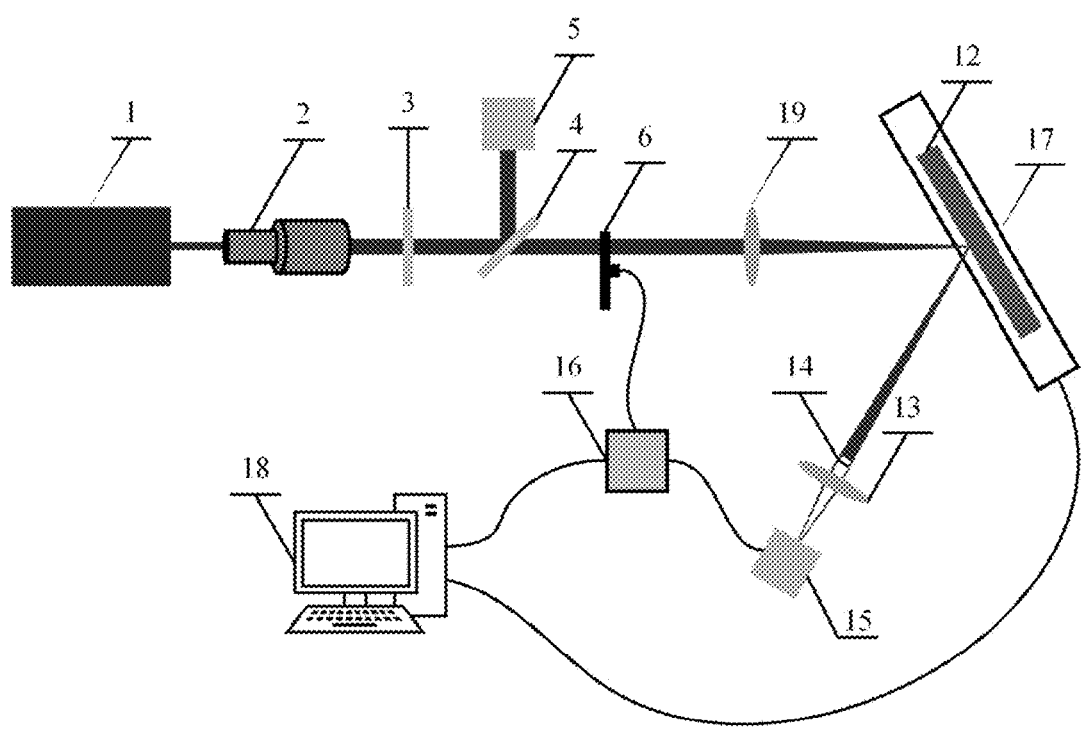
FIG. 3 shows the non-common-path-type single-beam photothermal measurement apparatus for absorptive defects of the present invention.

As shown in FIG. 3, the non-common-path-type single-beam photothermal measurement apparatus for absorptive defect comprises a laser 1, a beam expander 2, a power controller 3, a beam splitter 4, a power meter 5, a chopper 6, a converging lens 13, a obstruction aperture 14, a photoelectric detector 15, a lock-in amplifier 16, an XYZ translation stage 17, computer 18 and a second converging lens 19, and a to-be-measured sample 12 is placed on the XYZ translation stage 17.

The beam expander 2, the power controller 3, and the beam splitter 4 are sequentially arranged along a direction of a beam emitted by the laser 1; the beam splitter 4 divides an incident beam into weakly reflected light and strongly transmitted light with different intensities; the power meter 5 is arranged along a direction of the weakly reflected light; and the power meter 5 is used for monitoring power and stability of incident light. The chopper 6 is arranged along a direction of the strongly transmitted light, and the strongly transmitted light is modulated by the chopper and then is focused by the second converging lens 19 to irradiate the sample 12. The obstruction aperture 14, the converging lens 13 and the photoelectric detector 15 are sequentially arranged along a direction of reflected light. An output end of the photoelectric detector 15 is connected to a first input end of the lock-in amplifier 16. A modulation frequency of the chopper 6 is taken as a reference signal, and a reference signal output end is connected to a second input end of the lock-in amplifier 16 via a cable. The output end of the lock-in amplifier 16 is connected to an input end of the computer 18. A control signal output end of the computer 18 is connected to the control end of the XYZ translation stage 17.

A manufacturing method of the obstruction aperture 14 is as follows: circular aluminum film or chromium film is plated on the surface of circular fused silica glass with a thickness of 0.5 mm. The transmittance of the coated area is less than or equal to 0.01%. The radius of the coated area is greater than a beam waist radius of the beam spot incident to the obstruction aperture 14, such that the power of a passing beam is less than 1% of the power of the beam incident to the obstruction aperture 14.

Provided is a measurement method for surface absorptive defects of an optical element by using the non-common-path-type single-beam photothermal measurement apparatus for absorptive defects, comprising the following steps.

(1) The to-be-measured sample 12 is placed on an XYZ translation stage 17, under the control of the computer, the XYZ translation stage 17 moves the sample 12 along a Z direction, such that the surface of the to-be-measured sample 12 is close to the focal point of the second converging lens 19.

(2) A modulation frequency of the chopper 6 is set to be f, and a demodulation frequency of the lock-in amplifier 16 is set to be 2 times of the modulation frequency of the chopper 6, that is, 2f.

(3) The computer 18 drives the XYZ translation stage 17 to move, such that the focused spot output by the second converging lens 19 moves along X and Y directions on the surface of the to-be-measured sample, and the stepping distance of the focused spot moving along the X and Y directions is the diameter of the spot focused on the surface of the sample 12.

(4) At a measurement point, a measurement signal of the photoelectric detector 15 is input into the lock-in amplifier 16, and after being demodulated by the lock-in amplifier 16, an amplitude of a second harmonic wave (2f) of the measurement signal is output to the computer 18. The computer 18 records the amplitude of the measurement point in real time.

(5) Under the control of the computer, the XYZ translation stage 17 moves the sample 12 to the next measurement point along the X or Y direction, and the step (4) is returned until all measurements of the sample 12 are completed.

(6) The computer 18 draws recorded signal amplitudes into an absorptive defect two-dimensional distribution graph and performing analysis, gives an analysis report, and completes an absorption defect test of the sample 12.

An experiment shows that the single-beam photothermal measurement apparatus for absorptive defects of the present invention is simple in optical structure and convenient to align and adjustment. The measurement result is stable, and measurement signal anomalies caused by environmental vibration and sample tilt are avoided. By detecting a power change on the edge of the beam spot, the measurement sensitivity of a system is remarkably improved.

We claim:

1. A single-beam photothermal measurement apparatus for absorptive defects, comprising
   a laser (1),
   a beam expander (2),
   a power controller (3),
   a beam splitter (4),
   a power meter (5),
   a chopper (6),
   a polarization beam splitter (7),
   a quarter-wave plate (8),
   a mirror (9),
   a galvanometer scanner (10),
   a scanning lens (11),
   a converging lens (13),
   an obstruction aperture (14),
   a photoelectric detector (15),
   a lock-in amplifier (16),
   an XYZ translation stage (17), and
   a computer (18),
   wherein a sample (12) is placed on the XYZ translation stage (17);
   the beam expander (2), the power controller (3), and the beam splitter (4) are sequentially arranged along a direction of a beam emitted by the laser (1), the beam splitter (4) divides an incident beam into a first reflected light and a second transmitted light with different intensities, wherein the intensity of the first reflected light is less than the intensity of the second transmitted light, the power meter (5) is arranged along a direction of the first reflected light, and the chopper (6), the polarization beam splitter (7), the quarter-wave plate (8), the mirror (9), the galvanometer scanner (10), and the scanning lens (11) are sequentially arranged along a direction of the second transmitted light;
   the second transmitted light is modulated by the chopper (6) to form a modulated incident light;
   the modulated incident light passes through the polarization beam splitter (7) to output a p-polarized light, and the p-polarized light subsequently passes through the quarter-wave plate (8) to output a circularly polarized light;
   the circularly polarized light passes through the galvanometer scanner (10) and the scanning lens (11) and then is focused on a surface of the sample (12) to output a third reflected light;
   the surface of the sample (12) generates thermal deformation under laser irradiation;
   the third reflected light is modulated by the thermal deformation and sequentially passes through the scanning lens (11), the galvanometer scanner (10), the reflecting mirror (9), and the quarter-wave plate (8) to form an s-polarized light;
   the s-polarized light is reflected by the polarization beam splitter (7) to output a fourth reflected light, and then, the fourth reflected light is focused by the converging lens (13) to output a focused beam;
   after the focused beam passes through the obstruction aperture (14), the focused beam forms a focused beam spot, and part of the focused beam on edges of the focused beam spot is received by the photoelectric detector (15);

a modulation frequency of the chopper (6) is taken as a reference signal and is input into a second input end of the lock-in amplifier (16) via a cable;

a signal collected by the photoelectric detector (15) is taken as a measurement signal and is input into a first input end of the lock-in amplifier (16); and control signal output ends of the computer (18) are respectively connected to a control end of the XYZ translation stage (17) and a control end of the galvanometer scanner (10), and an output end of the lock-in amplifier (16) is connected to an input end of the computer (18).

2. The single-beam photothermal measurement apparatus for absorptive defects of claim 1, wherein the obstruction aperture (14) is prepared as follows:

plating circular aluminum film or chromium film on a surface of circular fused silica glass to form a coated area with a thickness of 0.5 mm;

wherein a transmittance of the coated area is less than or equal to 0.01%; and a radius of the coated area is greater than a beam waist radius of the beam spot incident to the obstruction aperture (14), the beam spot passes through the obstruction aperture to output a passing beam, and a power of the passing beam is less than 1% of a power of the beam spot incident to the obstruction aperture (14).

3. A measurement method for surface absorptive defects of an optical element by using the single-beam photothermal measurement apparatus for absorptive defects of claim 1, comprising:

(i) placing the sample (12) on an XYZ translation stage (17), and moving the sample (12) along a Z direction, such that the surface of the sample (12) is adjacent to a focal point of the scanning lens (11);

(ii) setting a modulation frequency of the chopper (6) to be f, and setting a demodulation frequency of the lock-in amplifier (16) to be 2 times of the modulation frequency of the chopper (6), that is, 2f;

(iii) driving, by the computer (18), an internal scanning reflecting mirror of the galvanometer scanner (10), such that the focused beam spot moves along X and Y directions on the surface of the sample to form raster scanning; a stepping distance of the focused beam spot moving along the X and Y directions being a diameter of the focused beam spot on the surface of the sample (12);

(iv) at a measurement point, inputting a measurement signal of the photoelectric detector (15) into the lock-in amplifier (16), and after being demodulated by the lock-in amplifier (16), outputting an amplitude of a second harmonic wave (2f) of the measurement signal to the computer (18); recording, by the computer (18), the amplitude of the measurement point in real time;

(v) moving, by the XYZ translation stage (17), the sample (12) to a next measurement area along the X or Y direction, and returning to the step (iii) until all measurements of the sample (12) are completed; and (vi) drawing, by the computer (18), recorded signal amplitudes into an absorptive defect two-dimensional distribution graph and performing analysis, giving an analysis report, and completing an absorption defect test of the sample (12).

\* \* \* \* \*